(12) United States Patent
Brinkmeyer et al.

(10) Patent No.: US 11,840,410 B2
(45) Date of Patent: Dec. 12, 2023

(54) ROBOTIC SYSTEM AND METHOD OF STACKING AND UNSTACKING WOOD BOARDS AND RELATED MATERIALS AND OF STACKING WOOD SPACERS AND RELATED MATERIALS

(71) Applicant: Idaho Forest Group, LLC, Coeur d'Alene, ID (US)

(72) Inventors: Marc Brinkmeyer, Coeur d'Alene, ID (US); Chad Kosmicki, Coeur d'Alene, ID (US)

(73) Assignee: Idaho Forest Group, LLC, Coeur d'Alene, ID (US)

( * ) Notice: Subject to any disclaimer, the term of this patent is extended or adjusted under 35 U.S.C. 154(b) by 0 days.

(21) Appl. No.: 17/540,221

(22) Filed: Dec. 1, 2021

(65) Prior Publication Data

US 2022/0177241 A1    Jun. 9, 2022

Related U.S. Application Data

(60) Provisional application No. 63/122,829, filed on Dec. 8, 2020.

(51) Int. Cl.
*B65G 61/00* (2006.01)
*B25J 9/00* (2006.01)

(52) U.S. Cl.
CPC ............ *B65G 61/00* (2013.01); *B25J 9/0093* (2013.01); *B65G 2201/0282* (2013.01); *B65G 2203/0225* (2013.01); *B65G 2207/08* (2013.01)

(58) Field of Classification Search
CPC ........... B65G 61/00; B65G 2201/0282; B65G 2203/0225; B65G 2207/08; B65G 47/91;
(Continued)

(56) References Cited

U.S. PATENT DOCUMENTS

| | | | | |
|---|---|---|---|---|
| 3,901,392 A | * | 8/1975 | Streckert | ............... B65G 57/04 901/6 |
| 4,747,634 A | * | 5/1988 | Hoke | .................. B66C 1/0293 267/179 |

(Continued)

FOREIGN PATENT DOCUMENTS

| AU | 2003290810 A1 | 6/2004 |
|---|---|---|
| CA | 2426057 A1 | 10/2003 |

(Continued)

OTHER PUBLICATIONS

PCT/US2021/062285—International Search Report and Written Opinion dated May 20, 2022, 28 pages.

*Primary Examiner* — Lynn E Schwenning
(74) *Attorney, Agent, or Firm* — Haynes Beffel & Wolfeld LLP; Andrew L. Dunlap

(57) ABSTRACT

Technology disclosed includes a robotic workstation for unstacking/stacking a multi-layer stack of boards and includes an end effector configured to pick up, move and release a layer of boards. The end effector includes first and second pick up and release members, each being (i) disposed below first and second support members, (ii) transversely arranged with respect to the first and second support members and (iii) attached to both of the first and second support members. The robotic workstation also includes a robotic manipulator connected to an attachment plate of the end effector and capable of moving the end effector. The robotic manipulator is under control of a controller executing stored instructions that perform operations including picking up the layer of boards by orienting the end effector such that each board of the layer of boards is transversely oriented with respect to the first and second pick up and release members.

23 Claims, 13 Drawing Sheets

(58) Field of Classification Search
CPC ..... B65G 57/18; B25J 15/0658; B25J 9/0093; B25J 15/0061; B25J 15/0616
See application file for complete search history.

(56) References Cited

U.S. PATENT DOCUMENTS

| | | | | |
|---|---|---|---|---|
| 5,375,967 | A * | 12/1994 | Rathert | B65G 57/005 |
| | | | | 414/789.5 |
| 5,437,533 | A | 8/1995 | VanderMeer et al. | |
| 5,609,377 | A * | 3/1997 | Tanaka | B65G 47/918 |
| | | | | 901/46 |
| 7,409,812 | B2 * | 8/2008 | Gilmore | B65G 57/04 |
| | | | | 53/473 |
| 8,087,869 | B1 | 1/2012 | Binford | |
| 11,235,939 | B2 * | 2/2022 | Wade | B65G 47/91 |
| 2004/0094979 | A1 | 5/2004 | Damhuis | |
| 2005/0226711 | A1 * | 10/2005 | Schnoor | B65G 61/00 |
| | | | | 414/736 |
| 2009/0292298 | A1 * | 11/2009 | Lin | B25J 15/0061 |
| | | | | 606/130 |
| 2011/0293397 | A1 * | 12/2011 | Lomerson, Jr. | B25J 15/024 |
| | | | | 414/800 |
| 2013/0127192 | A1 * | 5/2013 | Regan | B32B 38/1858 |
| | | | | 294/185 |
| 2014/0375072 | A1 * | 12/2014 | Cho | B25J 15/0616 |
| | | | | 901/31 |
| 2020/0215714 | A1 * | 7/2020 | Foulk | G05B 19/401 |

FOREIGN PATENT DOCUMENTS

| | | | | |
|---|---|---|---|---|
| DE | 202019101740 | * | 1/2006 | ............ B65G 61/00 |
| FR | 2973019 | A1 | 9/2012 | |
| WO | 9415862 | A1 | 7/1994 | |
| WO | 2020056437 | A1 | 3/2020 | |
| WO | 2020229054 | A1 | 11/2020 | |

* cited by examiner

ROBOTIC SYSTEM AND METHOD OF STACKING AND UNSTACKING WOOD BOARDS AND RELATED MATERIALS AND OF STACKING WOOD SPACERS AND RELATED MATERIALS

CROSS REFERENCE

This application claims benefit to U.S. Provisional Application No. 63/122,829, entitled "ROBOTIC SYSTEM AND METHOD OF STACKING AND UNSTACKING WOOD STICKERS AND RELATED MATERIALS", filed on Dec. 8, 2020, naming inventors Marc Brinkmeyer and Chad Kosmicki, the application of which is hereby incorporated by reference.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Processing timber involves the use of wood stickers (also referred to as spacers) to separate various stacks of lumber (hereinafter also referred to as boards) so that the boards can be processed, sorted, dried, etc. For example, boards will not sufficiently dry unless they are separated from one another. Spacers are used to separate the boards to provide a critical airflow pathway between the boards so as to allow for the transport of moisture away from the cellulosic fiber of the boards. A high volume of spacers is used in a timber mill that cuts and dries boards. Conventionally, multi-layer stacks of boards are transported in the lumber mill to a location where the boards are manually unstacked and placed on a conveyor system for transport to an appropriate location. Manual unstacking requires direct human attention by the way of manually grabbing and placing the boards onto the conveyor or manually controlling machinery to grab and place the boards onto the conveyor. Furthermore, the spacers are also manually placed onto a layer of boards directly by humans or by a human controlling a robot to do so.

These manual processes are inefficient and dangerous (prone to injuring those involved). Thus, a need arises for a robotic system and method of stacking and unstacking wood boards and related materials and of stacking wood spacers and related materials without direct human control.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

The technology disclosed relates to a robotic workstation for unstacking and stacking a multi-layer stack of boards, one layer at a time without direct human control. In one configuration, the robotic workstation can include an end effector configured to pick up, move and release an entire layer of boards of the multi-layer stack of boards. The end effector can include a first support member and a second support member, the first support member and the second support member being substantially parallel with one another, a first cross member and a second cross member, each of the first and second cross members extending between and being connected to both the first and second support members, a first pick up and release member and a second pick up and release member, each of the first and second pick up and release members being (i) disposed below the first and second support members when the end effector is picking up and releasing the entire layer of boards, (ii) transversely arranged with respect to the first and second support members and (iii) attached to both of the first and second support members, and an attachment plate. Further, the robotic workstation can be configured to include a robotic manipulator connected to the attachment plate of the end effector and capable of moving the end effector, the robotic manipulator being under programmed control of a programmable robot controller executing stored instructions. The stored instructions, when executed, can perform operations including picking up the entire layer of boards with the first and second pick up and release members by orienting the end effector such that each board of the entire layer of boards is transversely oriented with respect to the first and second pick up and release members.

In a particular implementation, the technology disclosed also provides a method of unstacking and stacking a multi-layer stack of boards, one later at a time, using a robotic workstation. In one configuration, the robotic workstation can include an end effector configured to pick up, move and release an entire layer of boards of the multi-layer stack of boards. The end effector can include a first support member and a second support member, the first support member and the second support member being substantially parallel with one another, a first cross member and a second cross member, each of the first and second cross members extending between and being connected to both the first and second support members, a first pick up and release member and a second pick up and release member, each of the first and second pick up and release members being (i) disposed below the first and second support members when the end effector is picking up and releasing the entire layer of boards, (ii) transversely arranged with respect to the first and second support members and (iii) attached to both of the first and second support members, and an attachment plate. The robotic workstation can also include a robotic manipulator connected to the attachment plate of the end effector and capable of moving the end effector, the robotic manipulator being under programmed control of a programmable robot controller executing stored instructions. Further, the method includes executing the stored instructions to perform operations including picking up the entire layer of boards with the first and second pick up and release members by orienting the end effector such that each board of the entire layer of boards is transversely oriented with respect to the first and second pick up and release members.

Particular aspects of the technology disclosed are described in the claims, specification and drawings.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

DETAILED DESCRIPTION

Figure 1:
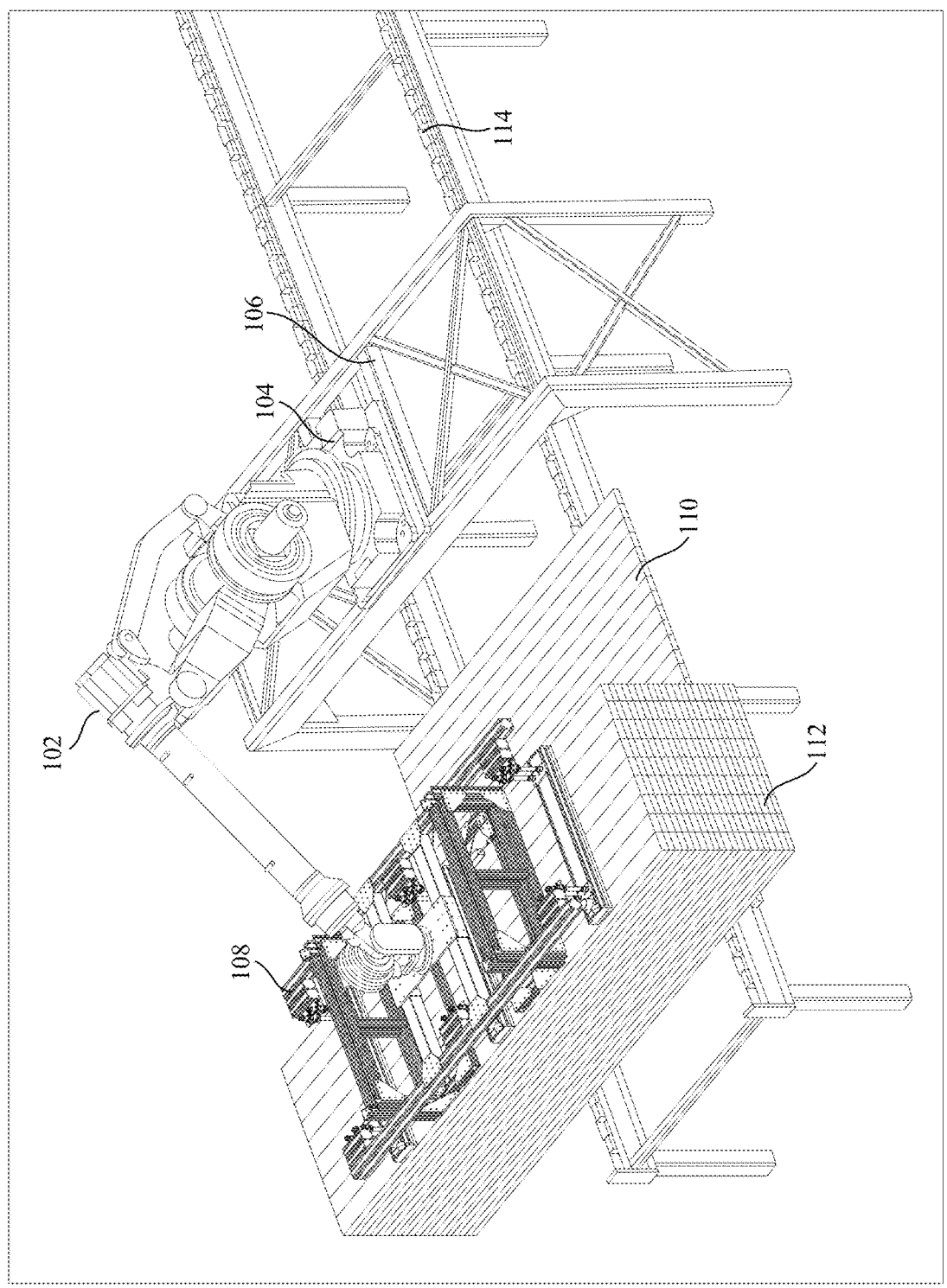
FIG. 1 illustrates a three-dimensional (3D) model of a robotic workstation for unstacking and stacking lumber (boards) and for stacking spacers on the boards when appropriate according to an embodiment of the technology disclosed.

The following description will typically be with reference to specific structural embodiments and methods. It is to be understood that there is no intention to be limited to the specifically disclosed embodiments and methods, but that other features, elements, methods, and embodiments may be used for implementations of this disclosure. Preferred embodiments are described to illustrate the technology disclosed, not to limit its scope, which is defined by the claims. Those of ordinary skill in the art will recognize a variety of equivalent variations on the description that follows. Unless otherwise stated, in this application specified relationships, such as parallel to, aligned with, or in the same plane as, mean that the specified relationships are within limitations of manufacturing processes and within manufacturing variations. When components are described as being coupled, connected, being in contact or contacting one another, they need not be physically directly touching one another unless specifically described as such. Like elements in various embodiments are commonly referred to with like reference numerals.

FIG. 1 illustrates a three-dimensional (3D) model of a robotic workstation for unstacking and stacking lumber (boards) and for stacking spacers on the boards when appropriate according to an embodiment of the technology disclosed.

Specifically, FIG. 1 illustrates a robotic workstation 100 that nominally includes a robotic manipulator 102 including a base 104 that can be affixed to the sawmill floor via a platform 106. Note that the location of the robotic manipulator 102 in FIG. 1 is only for illustrative purposes, as the base 104 can be directly or indirectly affixed to the sawmill floor, a wall, a ceiling or any other structure located within or surrounding the sawmill. The robotic workstation 100 also includes an end effector 108 that is attached to the robotic manipulator 102. The end effector 108 that is included in the robotic workstation 100 is configured to unstack boards 110 from a multi-layer stack of boards 112 onto a material handling system 114 (or any other location), as well as stack boards 110 from the material handling system 114 (or any other location) to form the multi-layer stack of boards 112. A board of the stack of boards 112 can have a range of dimensions including, but not limited to, 1.5 inches thick, 11.2 inches wide, and 20 feet long. Additionally, the end effector 108 can be capable of picking up, moving and releasing items other than boards (e.g., non-wood items, singular items, etc.).

The robotic workstation 100 also includes a programmable robot controller (not shown in FIG. 1 for clarity's sake) that controls the motions of the robotic manipulator 102 under direct operator control and/or by programmed logic. The end effector 108, which is coupled to the robotic manipulator 102 is able to move within a work envelope (e.g., a predefined area or space) to pick up, move and release the boards 110 under control of the robot controller.

The robotic manipulator 102 is preferably an industrial grade articulating robot arm (manipulator) capable of 360 degrees of free rotational movement and is capable of a 10-foot lateral movement of the end effector 108 and a 10-foot longitudinal movement of the end effector 108. The lateral movement of the end effector 108 and the longitudinal movement of the end effector 108 also be more or less than 10 feet. In one implementation, a highly customized Fanuc M-410ic robot can serve as the robotic manipulator 102. In one implementation, the robotic manipulator 102 includes feedback from servos that drive motions of the robotic manipulator 102, such as torque, arbor speed, robot force exerted, collision detection and others. Other implementations can be realized using a number of industrial-purpose commercially available robots made by Fanuc, ASEA, Kuka, ABB, Yaskawa and the like.

The material handling system 114 preferably includes conveyors, indexers, and the like to move individual boards 110 as well as the multi-layer stack of boards 112 into and out of the workstation 100. Further, the robotic workstation 100 can operate at speeds, such that approximately 15 cycles of picking up, moving and releasing an entire layer of boards can be accomplished in a minute.

Figure 2:
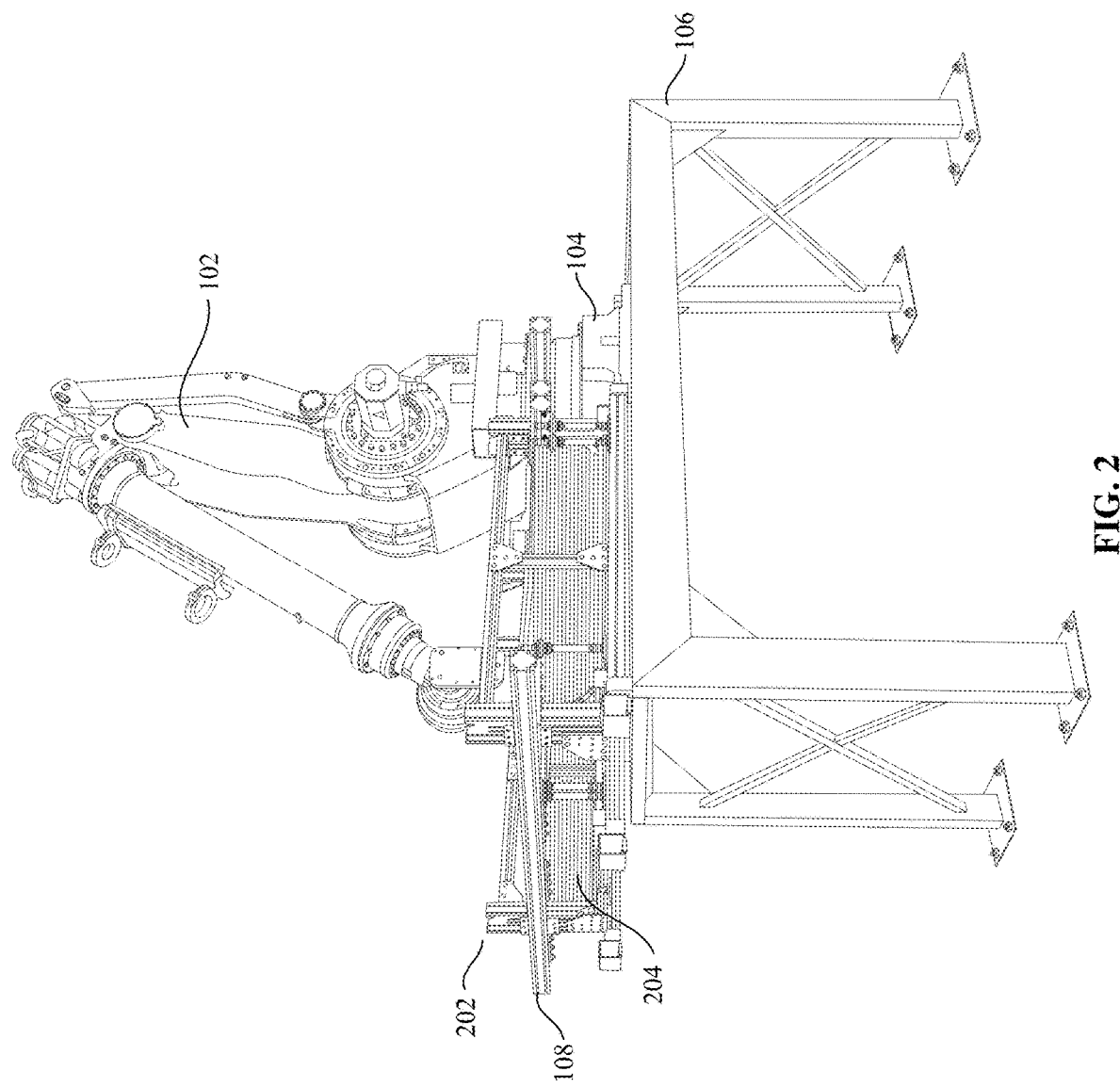
FIG. 2 illustrates a robotic manipulator and end effector with a spacer dispenser for unstacking and stacking lumber (boards) and for stacking spacers on the boards when appropriate according to an embodiment of the technology disclosed.

FIG. 2 illustrates a robotic manipulator and end effector with a spacer dispenser for unstacking and stacking lumber (boards) and for staking spacers on the boards when appropriate according to an embodiment of the technology disclosed.

Similar to FIG. 1, FIG. 2 illustrates a robotic manipulator 102 and an end effector 108 that is capable of unstacking lumber (boards) and for staking spacers on the boards when appropriate. The end effector 108 further includes a spacer dispenser 202 that holds and dispenses spacers 204. A spacer can have a range of dimensions include, but not limited to, 1 inch wide, 0.125 inches thick and 4 feet long. The spacer dispenser 202 is discussed in more detail below with reference to FIG. 8. The robotic manipulator 102 is connected to a base 104 that is connected to a platform 106.

Figure 3:
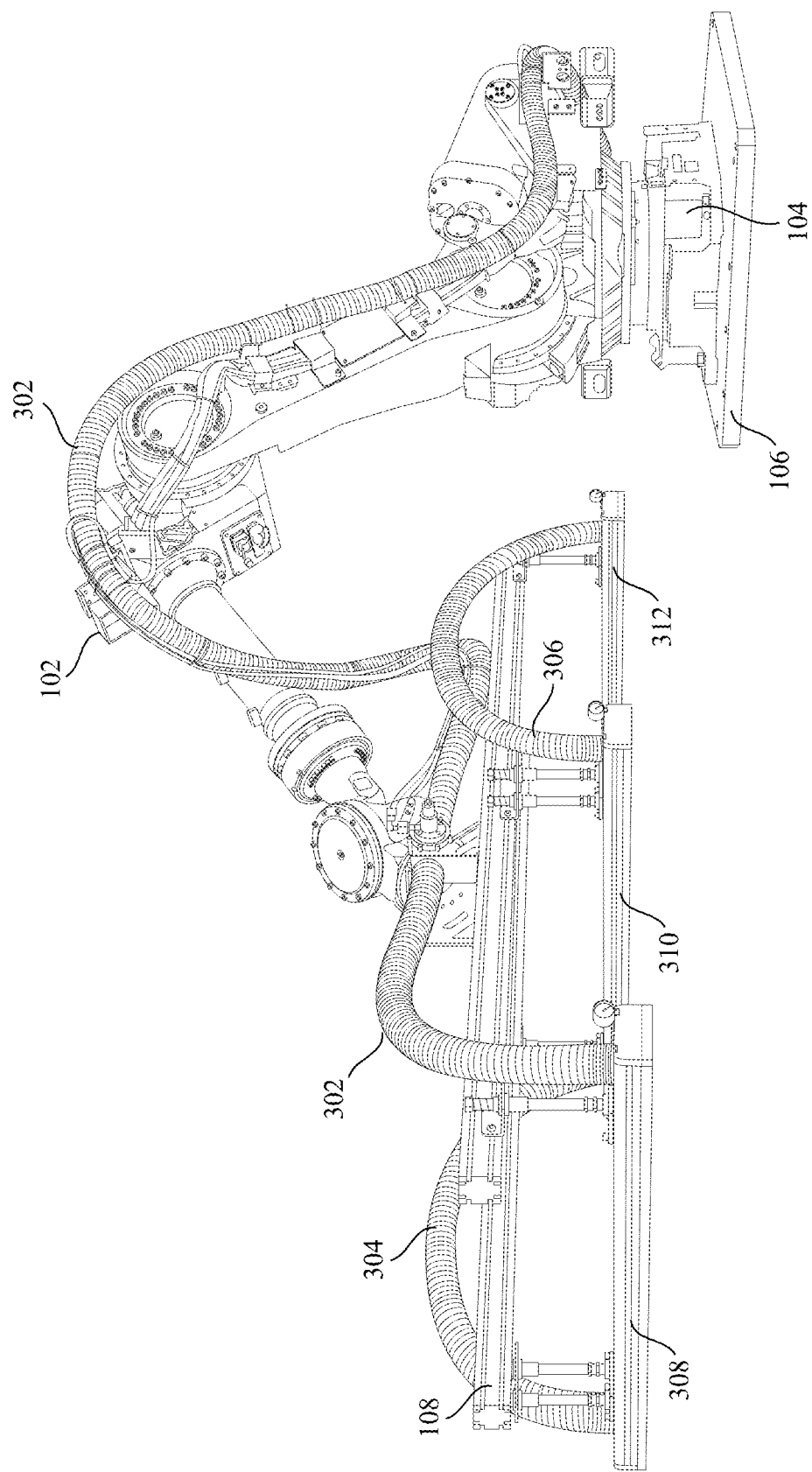
FIG. 3 illustrates a robotic manipulator and end effector for stacking and unstacking lumber (boards) and for stacking spacers on the boards when appropriate according to an embodiment of the technology disclosed.

FIG. 3 illustrates a robotic manipulator and end effector for stacking and unstacking lumber (boards) and for staking spacers on the boards when appropriate according to an embodiment of the technology disclosed.

Similar to FIGS. 1 and 2, FIG. 3 illustrates a robotic manipulator 102 and an end effector 108 that is capable of unstacking and stacking lumber (boards) and for staking spacers on the boards when appropriate. The robotic manipulator 102 is connected to a base 104 that is connected to a platform 106. Additionally, FIG. 3 illustrates a vacuum system that is controlled by the programmable robot controller. The vacuum system is capable of providing vacuum air pressure to various components of the end effector 108 (e.g., vacuum head, not illustrated, which can include foam, rubber or other related materials disposed thereon so as to seal any gaps and allow a strong vacuum to be established). Specifically, the vacuum air pressure is provided from a pumping mechanism (not illustrated) to a tube 302 which is connected to a first pick up and release member 308, which is described in more detail below. The tube 302 provides vacuum air pressure to the first pick up and release member 308 to allow a vacuum seal to be formed with a board (or other item) so that the board can be picked up by the end effector 108.

Another tube 304 connects the first pick up and release member 308 to a second pick up and release member 310. The tube 304 provides vacuum air pressure to the second pick up and release member 310 to allow a vacuum seal to be formed with the board (or other item) so that the board can be picked up by the end effector 108. A tube 306 connects the second pick up and release member 310 to a third pick up and release member 312 to allow a vacuum seal to be formed with the board (or other item) so that the board can be picked up by the end effector 108. Specifically, the vacuum system provides suction pressure when picking up and moving the boards and provides no (or less) air pressure or reverse/positive non-suction air pressure when releasing the boards. Further, the vacuum system can include pressure sensors configured to continuously monitor the pressure of the vacuum system and continuously adjust the air pressure according to the continuously monitored air pressure. The robotic workstation 100 can be controlled such that a vacuum seal is not necessarily created at each of the first, second and third pick up and release members 308, 310, 312. Any configuration of active vacuums at the first, second and third pick up and release members 308, 310 and 312 can be implemented. For example, rather than having tubes 304 and 306 provide vacuum pressure to the second and third pick up and release members 310, 312 as illustrated in FIG. 3, individual tubes can come directly from the pumping mechanism or can branch off from tube 302 to directly provide vacuum pressure to the second and third pick up and release members 310, 312.

The tubes 302, 304, 306 can have diameters ranging from ¾ of an inch to 4 inches. The pumping mechanism that creates the vacuum can be, for example, a Schmalz 4.8 kw Motor with Vacuum pump.

Figure 4:
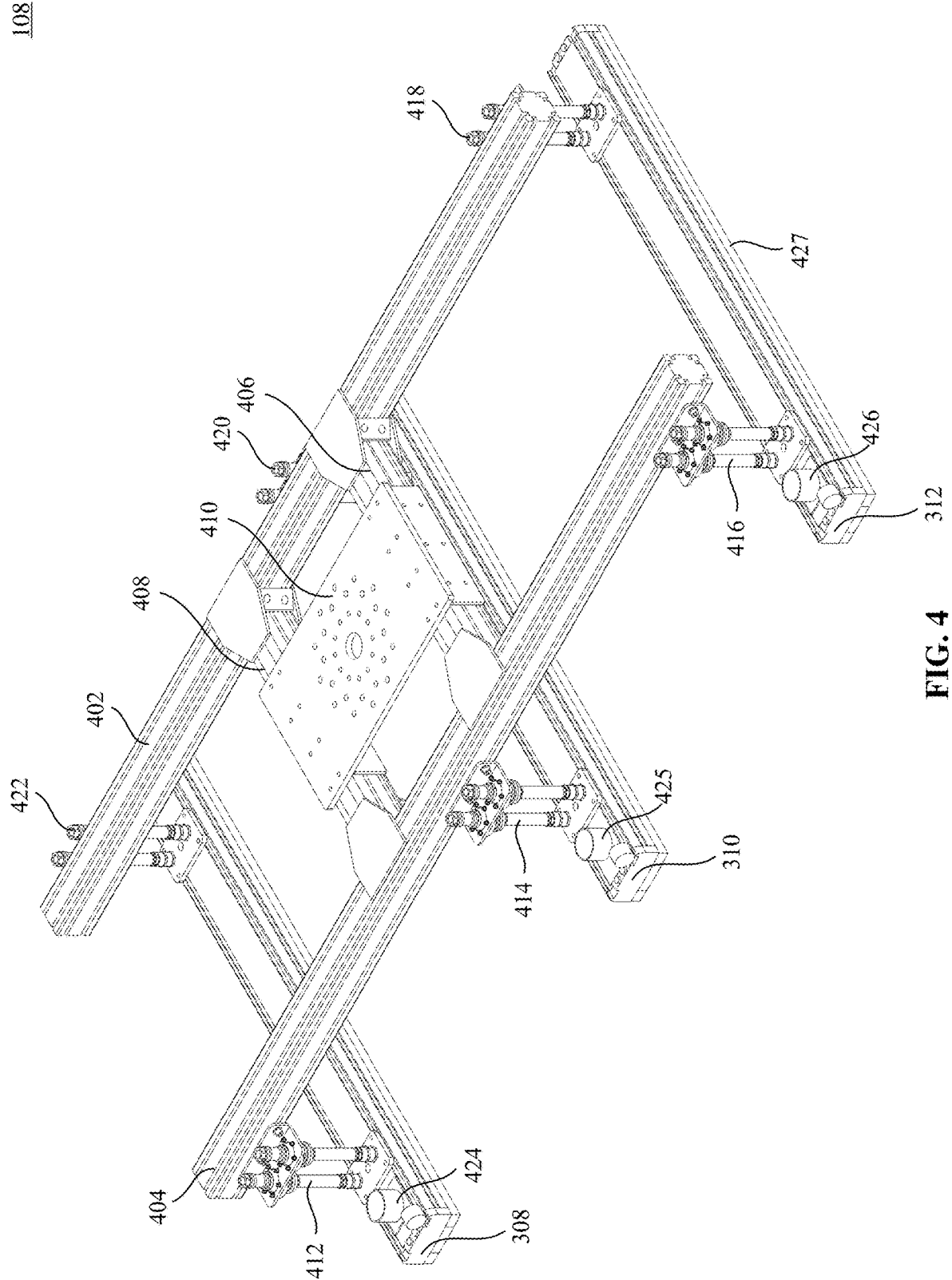
FIG. 4 illustrates a top perspective view of an end effector for stacking and unstacking boards according to an embodiment of the technology disclosed.

FIG. 4 illustrates a top perspective view of an end effector for stacking and unstacking boards according to an embodiment of the technology disclosed.

Specifically, FIG. 4 illustrates the end effector 108 (of the robotic workstation 100) that is configured to pick up, move and release an entire layer of boards 110 of the multi-layer stack of boards 112. The end effector 108 can include a first support member 402 and a second support member 404. The first support member 402 and the second support member 404 can be substantially parallel with one another. Further, the end effector 108 includes a first cross member 406 and a second cross member 408. Each of the first and second cross members 406, 408 extend between and are connected to both of the first and second support members 402, 404. While FIG. 4 illustrates two support members 402, 404, the end effector 108 can include more than two or fewer than two support members. Similarly, while FIG. 4 illustrates two cross members 406, 408, the end effector 108 can include more than two or less than two cross members. Alternatively, the end effector 108 can have a structure without any support members, which is discussed in more detail below.

The end effector 108 also includes the first pick up and release member 308, the second pick up and release member 310 and the third pick up and release member 312. The technology disclosed does not necessary require three pick up and release members, there can be more or less pick up and release members depending upon the amount and size of the layers of boards. Each of the first, second and third pick up and release members 308, 310, 312 is disposed below the first and second support members 402, 404 when the end effector 108 is picking up and releasing the entire layer of boards 110. Further, each of the first, second and third pick up and release members 308, 310, 312 is transversely arranged with respect to the first and second support members 402, 404. Additionally, each of the first, second and third pick up and release members 308, 310, 312 is attached to both of the first and second support members 402, 404.

Additionally, the end effector 108 includes an attachment plate 410 that connects to the robotic manipulator 102, so that the robotic manipulator 102 can move and control the end effector 108 to pick up, move and release the boards. The end effector 108 can pick up, move and release a variable number of boards. The number of boards that the end effector 108 can pick up, move and release is only limited by the length of and number of pick up and release members, as well as the width, height and length of the boards.

Furthermore, the end effector 108 can include an automatic heights adjustment system that connects each of the first, second and third pick up and release members 308, 310, 312 to the first and second support members 402, 404. The height adjustment system can adjust the height of the first, second and third pick up and release members 308, 310, 312 with respect to one another and with respect to the first and second support members 402, 404 to which they are attached, so as to account for unevenness in any of the boards being picked up and moved by the end effector 108. Specifically, the automatic height adjustment system can include a first height adjustment mechanism 412 connecting one end of the first pick up and release member 308 to the second support member 404 and can include a second height adjustment mechanism 422 connecting another end of the first pick up and release member 308 to the first support member 402. The automatic height adjustment system can include a third height adjustment mechanism 414 connecting one end of the second pick up and release member 310 to the second support member 404 and can include a fourth height adjustment mechanism 420 connecting another end of the second pick up and release member 310 to the first support member 402. Additionally, the automatic height adjustment system can include a fifth height adjustment mechanism 416 connecting one end of the third pick up and release member 312 to the second support member 404 and can include a sixth height adjustment mechanism 418 connecting another end of the third pick up and release member 312 to the first support member 402.

The first, second, third, fourth, fifth and sixth height adjustment mechanisms 412, 422, 414, 420, 416, 418 can include springs for automatically adjusting the heights of the first, second and third pick up and release members 308, 310, 312 as downward pressure is being applied to the end effector 108 by the robotic manipulator 102 and as upward pressure is being received by the first, second and third pick up and release members 308, 310, 312 from the boards. Instead of springs, the first through sixth height adjustment mechanisms 412, 422, 414, 420, 416 and 418 can include other mechanisms for height adjustment, such as shocks, linear gears and motors, or screwing mechanisms.

Alternatively, the end effector 108 can have a structure, such that the first, second and third pick up and release members 308, 310, 312 are directly (or indirectly via an automatic height adjustment system) connected to the attachment plate 410, without the use of the first and second support members 402, 404 and without the use of the first and second cross members 406, 408.

Additionally, FIG. 4 illustrates vacuum tube connectors 424, 425, 426 respectively located on the first pick up and release member 308, the second pick up and release member 310 and the third pick up and release member 312. These are just example locations of the vacuum tube connectors 424, 425, 426. Additional vacuum tube connectors can be located on different portions of the first, second and third pick up and release members 308, 310, 312 for the purpose of connecting to tubes 302, 304, 306 which create suction to pick up and keep the boards in place.

Further, a material 427, such as sealing foam, rubber, etc., is disposed on the bottoms of the first, second and third pick up and release members 308, 310, 312. This material 427 can be deposited over the bottom of the first, second and third pick up and release members 308, 310, 312 and/or it can be placed at the bottom of vacuum heads (not illustrated) to seal any gaps and allow for a strong vacuum to be established. The vacuum heads can be comprised of, for example aluminum or other suitable material and they can be spread over the bottoms of the first, second and third pick up and release members 308, 310, 312 in a pattern or arrangement that is conducive to forming a vacuum seal with each of the pieces of lumber being picked up. The pattern or arrangement can be dictated based on the size (dimensions) of the lumber being picked up. The material 427 can have holes that line up with the vacuum heads so as to form a pathway from the vacuum heads through the material 427 and to the boards being stacked and unstacked. The material 427 has certain qualities such that it allows for an air seal sufficient enough to create and maintain enough suction for the boards to be picked up by the end effector 108.

Figure 5:
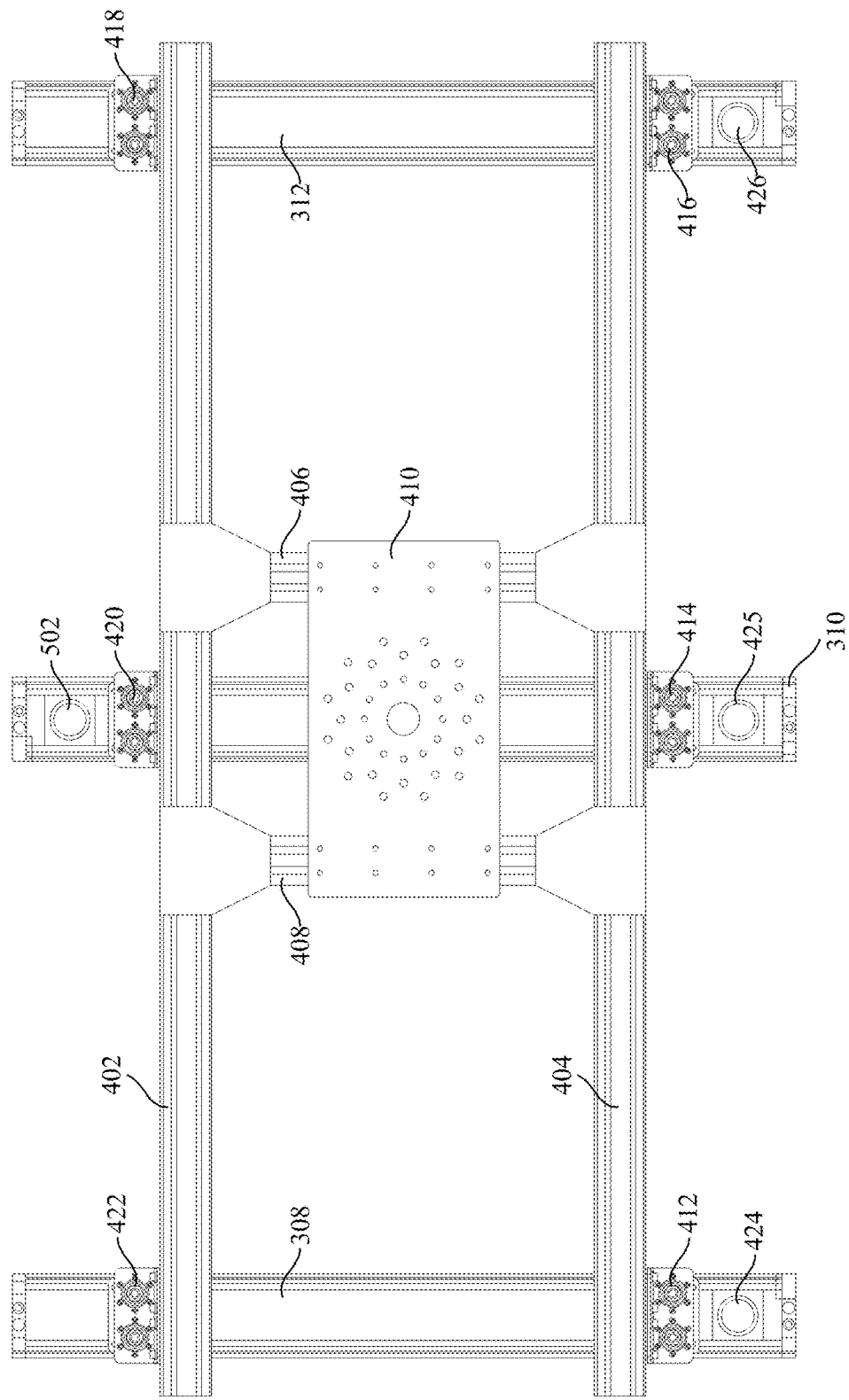
FIG. 5 illustrates a top view of an end effector for stacking and unstacking boards according to an embodiment of the technology disclosed.

FIG. 5 illustrates a top view of an end effector for stacking and unstacking boards according to an embodiment of the technology disclosed.

Specifically, FIG. 5 illustrates the top view of the end effector 108 including the same components and reference elements as discussed above with reference to FIG. 4, except that FIG. 5 further illustrates another vacuum tube connector 502. Therefore, redundant descriptions thereof are omitted.

Figure 6:
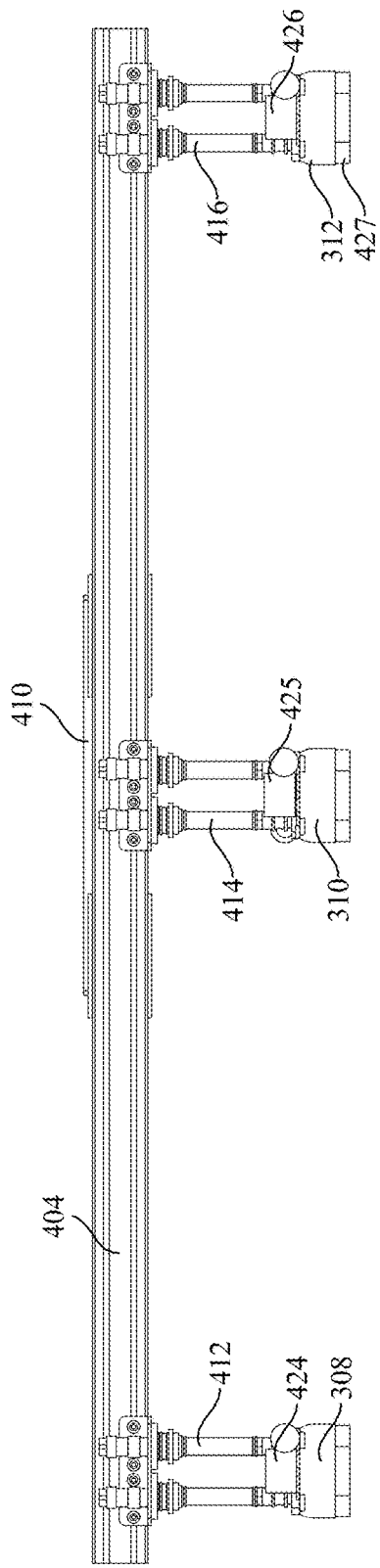
FIG. 6 illustrates a front view of an end effector for stacking and unstacking boards according to an embodiment of the technology disclosed.

FIG. 6 illustrates a front view of an end effector for stacking and unstacking boards according to an embodiment of the technology disclosed.

Specifically, FIG. 6 illustrates the front view of the end effector 108 including the same components and reference elements as discussed above with reference to FIGS. 4 and 5. Therefore, redundant descriptions thereof are omitted.

Figure 7:
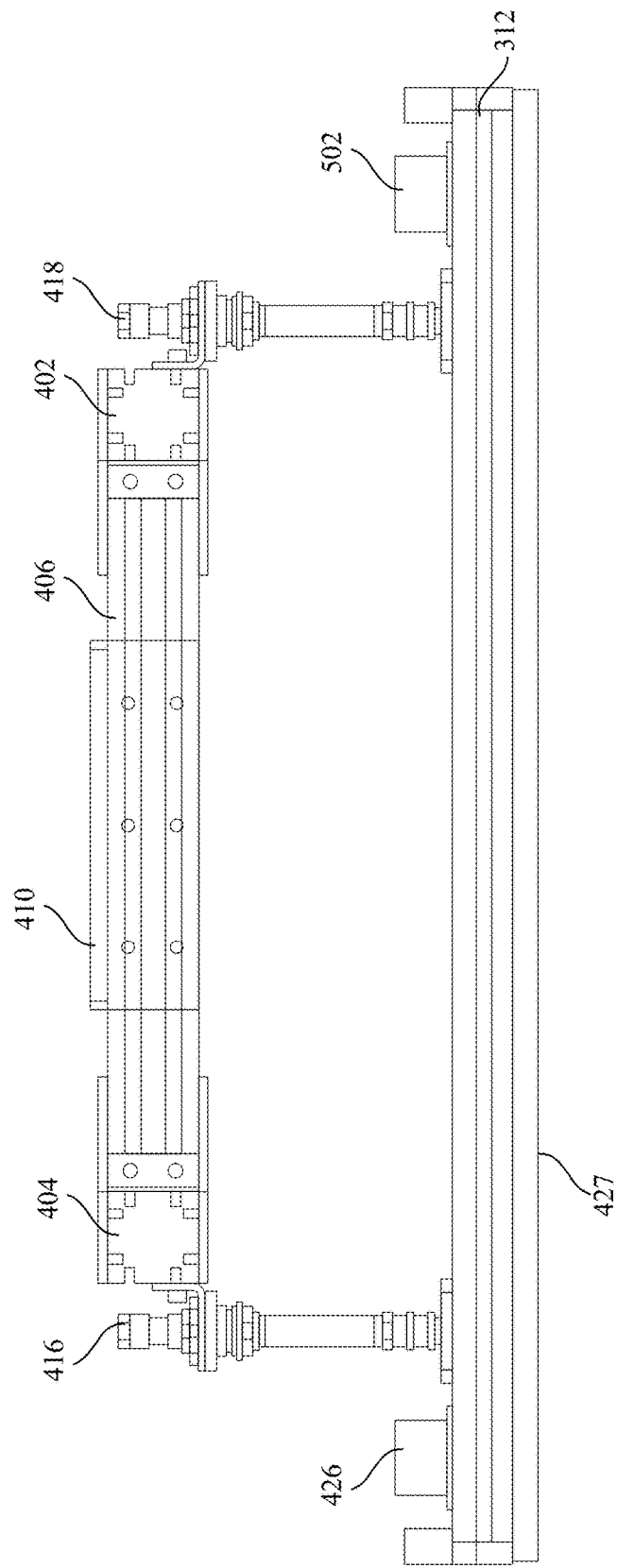
FIG. 7 illustrates a (right) side view of an end effector for stacking and unstacking boards according to an embodiment of the technology disclosed.

FIG. 7 illustrates a (right) side view of an end effector for stacking and unstacking boards according to an embodiment of the technology disclosed.

Specifically, FIG. 7 illustrates the (right) side view of the end effector 108 with the same components and reference elements as discussed above with reference to FIGS. 4-6. Therefore, redundant descriptions thereof are omitted. The measurements illustrated in FIG. 7 are merely examples.

Figure 8:
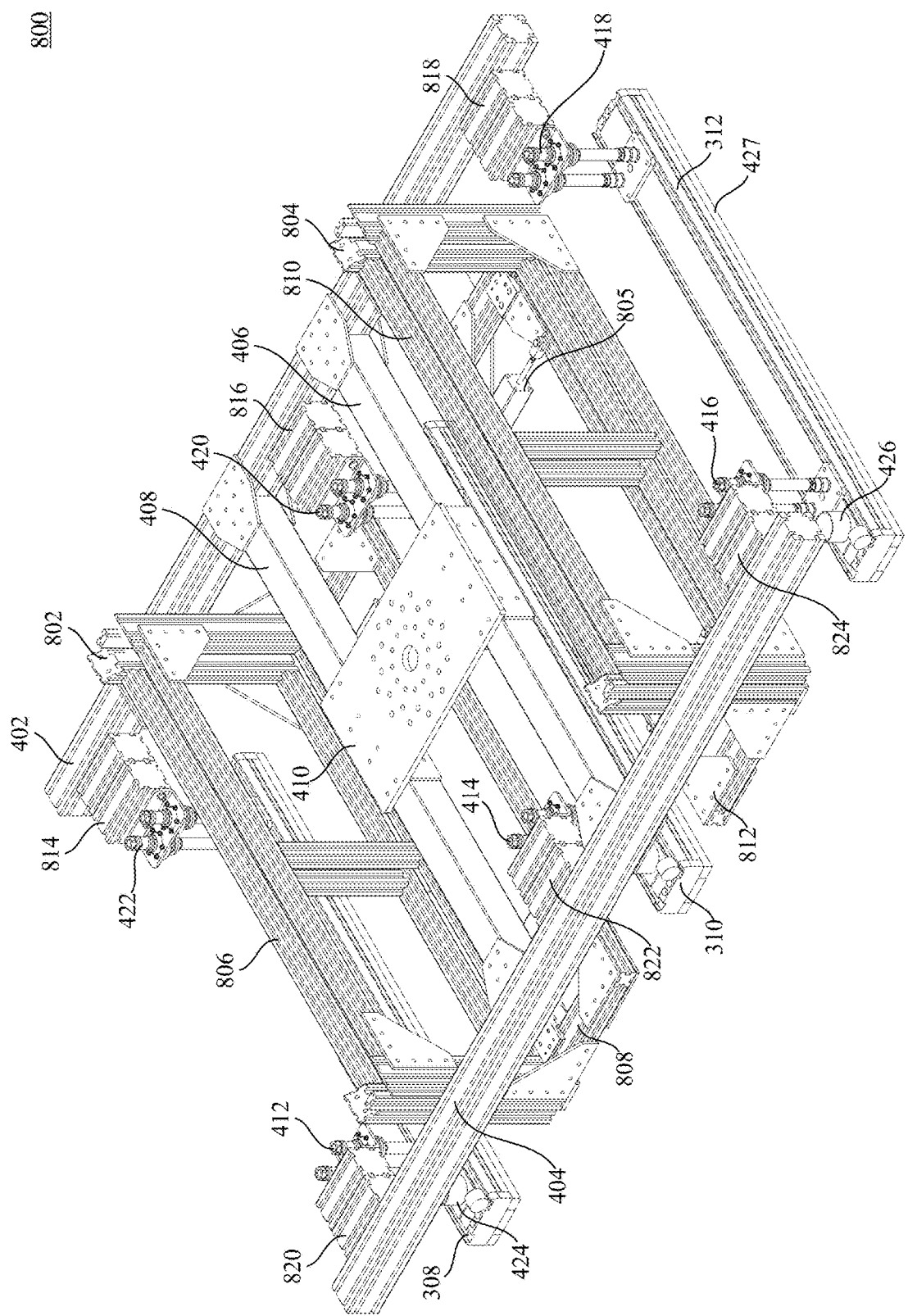
FIG. 8 illustrates a top perspective view of an end effector with a spacer dispenser for stacking spacers on the boards according to an embodiment of the technology disclosed.

FIG. 8 illustrates top perspective view of an end effector with a spacer dispenser for stacking spacers on the boards according to an embodiment of the technology disclosed.

Specifically, FIG. 8 illustrates an end effector 800 that has a different structure than the end effector 108 illustrated in FIGS. 4-7. However, many of the components of the end effector 800 are similar to the components of the end effector 108. Redundant descriptions of the similar components are omitted in the description of FIG. 8.

As illustrated in FIG. 8, the first and second support members 402, 404 are spaced further apart than as illustrated in FIGS. 4-7. As a result of the additional space between the first and second support members 402, 404, the first and second cross members 406, 408 are longer than the first and second cross members 406, 408 illustrated in FIGS. 4-7. The first support member 402 includes a first extender 814, a second extender 816 and a third extender 818 that respectively connect the first support member 402 to the second height adjustment mechanism 422, the fourth height adjustment mechanism 420 and the sixth height adjustment mechanism 418. The second support member 404 includes a first extender 820, a second extender 822 and a third extender 824 that respectively connect the second support member 404 to the first height adjustment mechanism 412, the third height adjustment mechanism 414 and the fifth height adjustment mechanism 416.

Additionally, the end effector 800 includes a first spacer dispensing member 802 and a second spacer dispensing member 804. Each of the first and second spacer dispensing members 802, 804 holds a stack of spacers and deposits a spacer from the bottom of each stack onto a top of the stack of lumber or onto a top of another stack of boards, such as boards 110 or 112 of FIG. 1. For example, the spacers can be deposited every few layers of lumber (e.g., the boards 110 or 112), as determined by the operator and as dictated by the dimensions of the lumber. This provides stability to the stack of lumber (or boards) and keeps outside ends pieces from falling off of the stack. The first spacer dispensing member 802 includes a side portion 806 and a bottom portion 808. The side portion 806 and the bottom portion 808 form an "L" shape. The second spacer dispensing member 804 includes a side portion 810 and a bottom portion 812. The side portion 810 and the bottom portion 812 form a reverse "L" shape. The side portions 806, 810 and the bottom portions 808, 812 hold the stacks of spacers in place while the end effector 800 is picking up, moving and releasing the lumber (i.e., stacking and/or unstacking the lumber or other components using the first, second and/or third pick up and release members 308, 310, 312). Other structures will be apparent to a person of ordinary skill in the art. Further, the first and second spacer dispensing members 802 and 804 can be stationary with respect to each other or they can be structured to allow for lateral movement with respect to each other. The first spacer dispensing member 802 includes one or more cylinders 803 (see FIG. 9) and the second spacer dispensing member 804 includes one or more cylinders 805 (see FIG. 9). The cylinders 803, 805 are connected to plates or other structures that push the bottom spacers from the stacks of spacers, such that the bottom spacers are placed on top of the layer of lumber. The spacers can be pushed out through a small opening that can be approximately 1.5 times the thickness of a single spacer in order to prevent two spacers being dispensed at the same time. The one or more cylinders 803 and 805 can retract and the stack of spacers will drop down with gravity so that the next layer of spacers will be ready for dispensing when the time is appropriate. The one or more cylinders 803 can be connected to one another by a connecting object (e.g., a bar), such that a spacer is evenly dispensed by the connecting object when the one or more cylinders 803 are actuated. Similarly, the one or more cylinders 805 can be connected to one another by another connecting object, such that a spacer is evenly dispensed by the connecting object when the one or more cylinders 805 are actuated. As mentioned above, this can be one, for example, at a predetermined number of layers/courses of the lumber, in order to provide stability to the stack of lumber and to allow for airflow between layers of lumber. The cylinders 803, 805 can be air cylinders or they can be any other type of cylinder. Alternatively, the cylinders 803, 805 can be replaced by other mechanisms capable of moving the plates or other structures to push the bottom spacers from the stacks of spacers.

Figure 9:
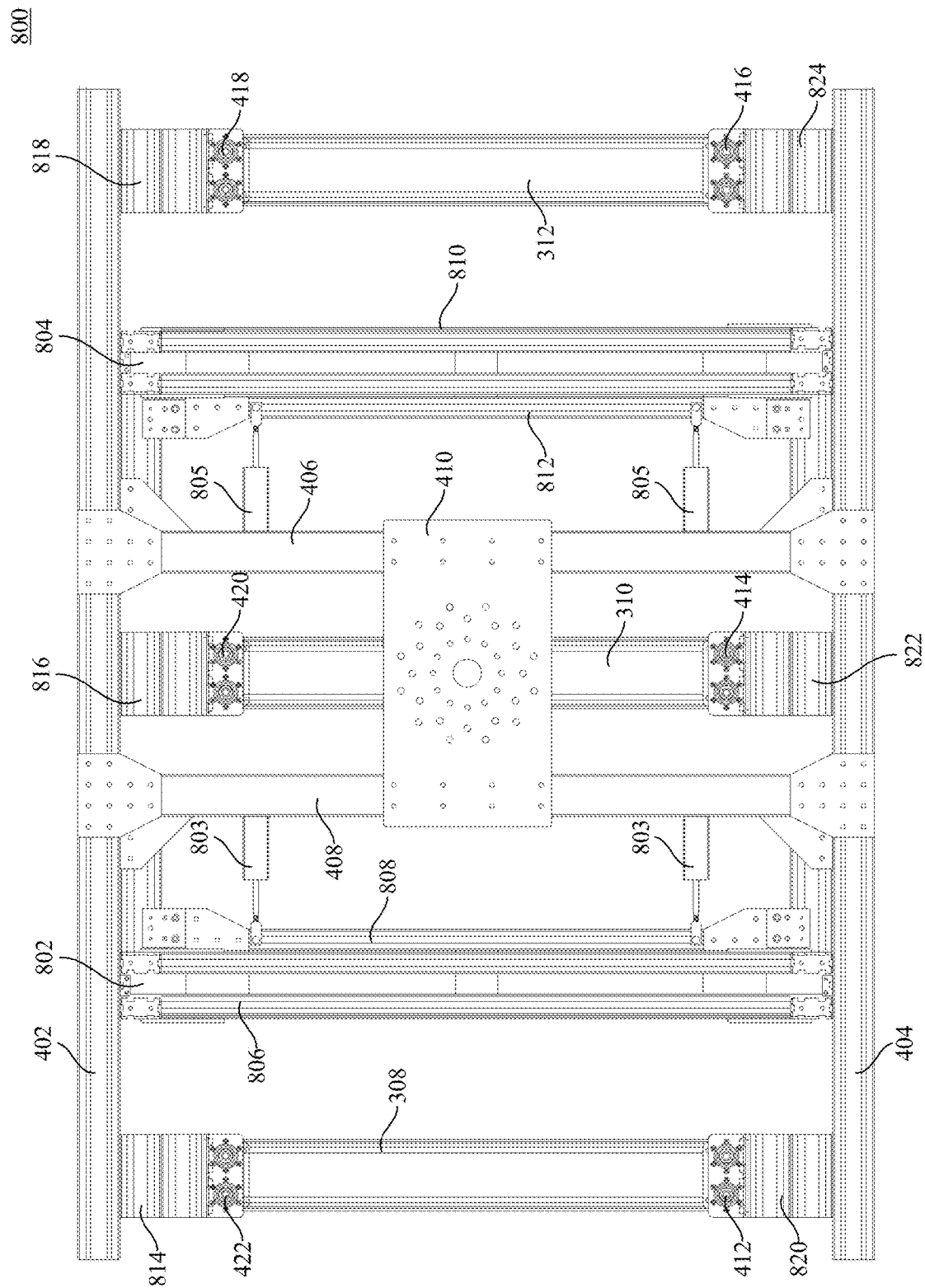
FIG. 9 illustrates a top view of an end effector with a spacer dispenser for stacking spacers on the boards according to an embodiment of the technology disclosed.

FIG. 9 illustrates a top view of an end effector for stacking spacers on the boards according to an embodiment of the technology disclosed.

Specifically, FIG. 9 illustrates the top view of the end effector 800 including the same components and reference elements as discussed above with reference to FIG. 8. Therefore, redundant descriptions thereof are omitted.

Figure 10:
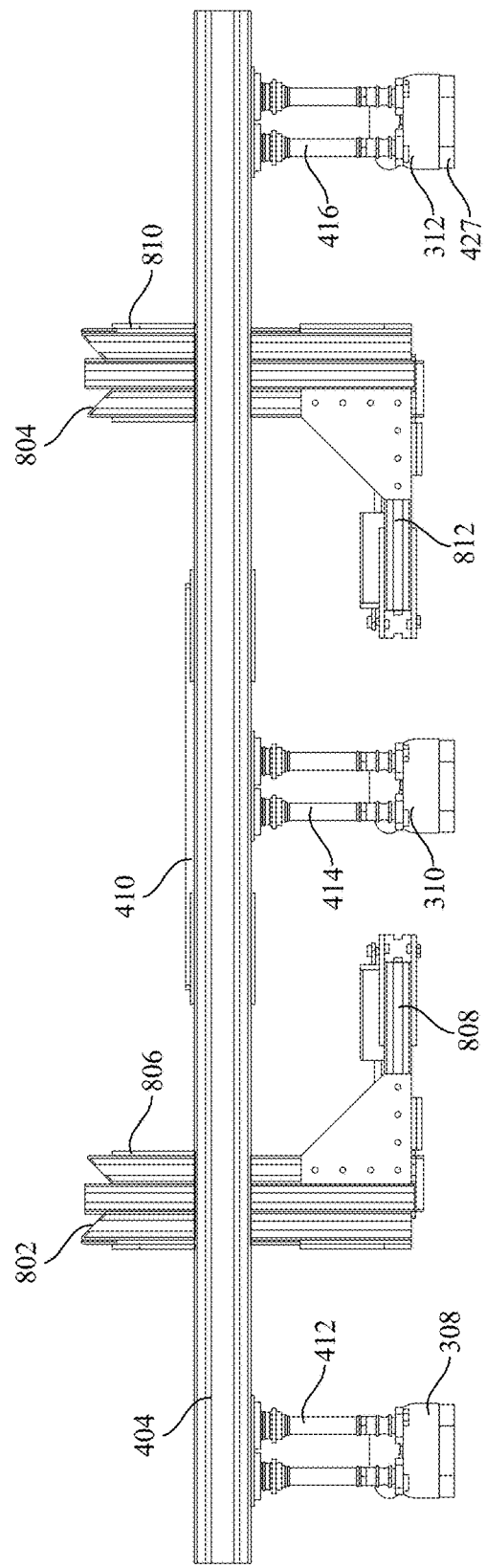
FIG. 10 illustrates a front view of an end effector with a spacer dispenser for stacking spacers on the boards according to an embodiment of the technology disclosed.

FIG. 10 illustrates a front view of an end effector for stacking spacers on the boards according to an embodiment of the technology disclosed.

Specifically, FIG. 10 illustrates the front view of the end effector 800 including the same components and reference elements as discussed above with reference to FIGS. 8 and 9. Therefore, redundant descriptions thereof are omitted.

Figure 11:
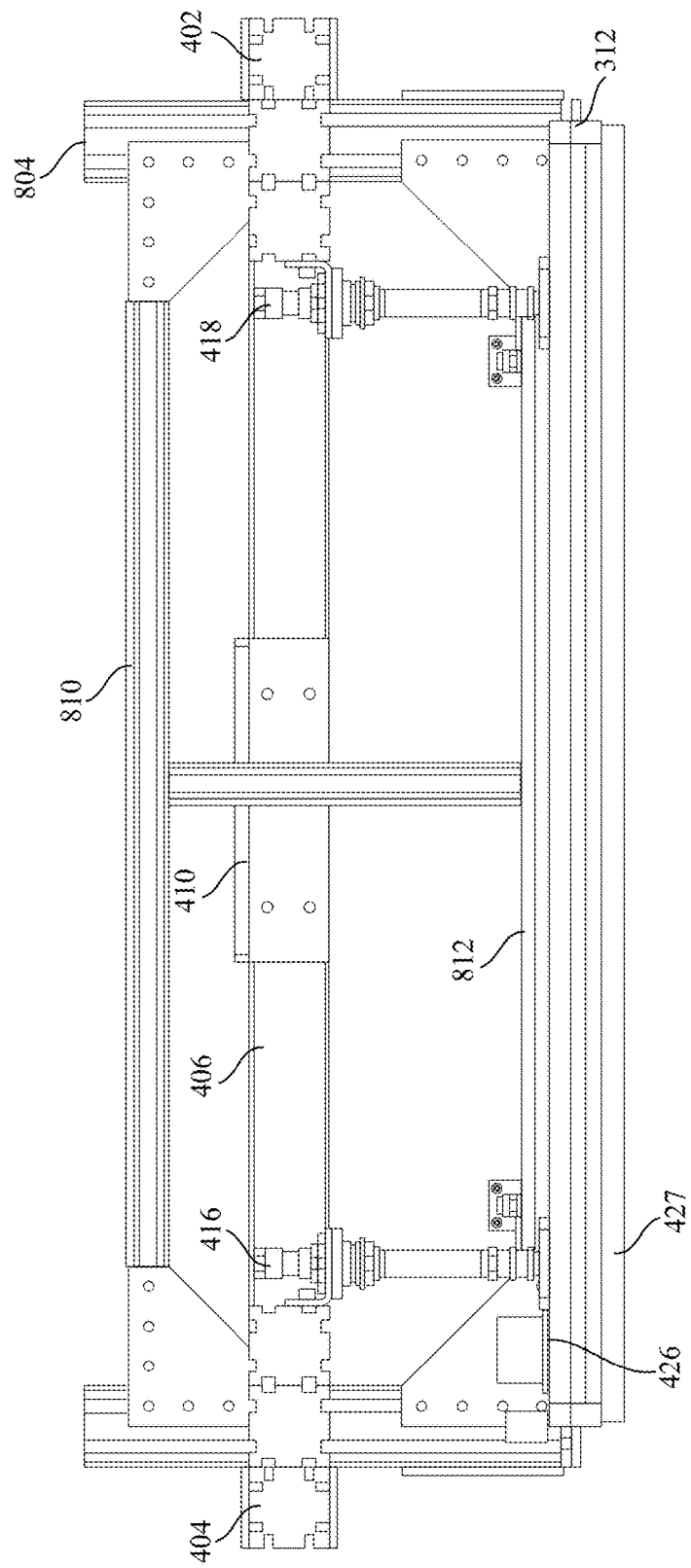
FIG. 11 illustrates a (right) side view of an end effector with a spacer dispenser for stacking spacers on the boards according to an embodiment of the technology disclosed.

FIG. 11 illustrates a (right) side view of an end effector for stacking spacers on the boards according to an embodiment of the technology disclosed.

Specifically, FIG. 11 illustrates the (right) side view of the end effector 800 with the same components and reference elements as discussed above with reference to FIGS. 8-10. Therefore, redundant descriptions thereof are omitted.

In addition to the features and structures discussed above with reference to FIGS. 1-11, the robotic workstation 100 can include the following components and features: (i) an operator console for controlling various aspects of the operations performed by the robotic workstation 100 including rapid response functions for emergency shut-off; (ii) an ignition human-machine interface (HFI) for system operation and diagnostics; various programming interfaces, such as a programmable logic controller (PLC) (e.g., a Controllogix PLC); (iii) safety fencing; (iv) network switches; (v) various electrical and mechanical components for installation in the mill; (vi) collection of data for reporting and monitoring purposes; and (vii) user frame calibration plates to simplify the calibration of the robotic workstation 100. Additionally, the robotic workstation 100 can utilize clean dry air provided at 16 cubic feet per minute (CFM) at 90 pounds per square inch (PSI) with 5-micron filtration. Other types of air requirements can be implemented. Further, the robotic workstation 100 can require 100 Amp service with two 30 Amp breakers and two 15 Amp breakers. Other electrical and breaker requirements can also be implemented based on the type and exact configuration of the robotic manipulator 102, the vacuum pump, the end effector 108, 800 and the control system.

Furthermore, a process of unstacking and stacking the boards is provided below. The process can include (including or excluding any of the other steps provided herein): (i) a complete course (i.e., an entire layer) of lumber is added/place, such that it is even ended (i.e., all of the pieces of lumber are flush to one side and presented in a common location for picking by the robotic workstation 100; (ii) an overhead camera system detects that a full/complete course is ready to be picked up and a robotic stacker cycle is initiated; (iii) the robotic manipulator 102 positions the end effector 108, 800 appropriately over the course to be picked and picks the course using a predetermined number of vacuum heads (using first, second and/or third pick up and release members 308, 310, 312); (iv) the robotic manipulator 102 presses the end effector 108, 800 down slightly on to the course and the vacuum system is turned on allowing all boards to be held tightly for transport to the stacking location; (v) the robotic manipulator 102 and the end effector 108, 800 lifts the boards and proceeds to the predetermined stack location; (vi) an amount of vertical travel required is calculated using a PLC and camera to determine the final positioning of the course; (vii) the robotic manipulator 102 and the end effector 108, 800 places the course of lumber (boards) onto the predetermined position and automatically dispenses the boards (and spacers when appropriate). Additionally, automatic reloading of the spacer placement components of the end effector 108, 800 can be implemented. Although the technology disclosed refers to picking up, moving and releasing boards and releasing spacers, other materials can be picked up, moved and released as well. Some examples include cardboard/paper items, vinyl items, composite items, etc.

The robotic manipulator 102 and base 104 do not necessarily need to be placed on a horizontal surface and can be place on a vertical surface or any range of angles between horizontal and vertical.

Additional features included in various implementations of the robotic workstation 100 include the use of (i) sensors such as force sensors that are implemented to dynamically adjust the speed and motion of the robotic manipulator 102 and the end effector 108, 800 and (ii) area sensors for detection of entry into a danger zone. Additionally, the time per cycle (pick up, move, release and return) cut can vary based on the size and weight of the boards, where the robotic workstation 100 is capable of adapting to various motor sizes, depending on current requirements of the mill. Motors, robotic manipulators and end effectors can be changed or swapped based on various requirements. For example, the robotic manipulator 102 and end effector 108, 800, as well as other components of the robotic workstation 100, can be selected and implemented based on the requirements (e.g., volume throughput) of the mill.

As mentioned above, multiple robotic manipulators (or robotic workstations) can be combined, such that the robotic manipulators are sufficiently spaced apart by, for example 20, feet. For sake of clarity, a single robotic workstation can include multiple robotic manipulators or, as mentioned above, multiple robotic workstations can be implemented, where each robot workstation includes a single robotic manipulator. The number of robotic manipulators is dictated by a desired speed of throughput of the mill. The robotic manipulators can be programmed to perform picking up, moving, releasing and returning in coordination with one another while working on the same stack of boards or they can individually work on separate stacks of boards.

Electronics Architecture

Figure 12A:
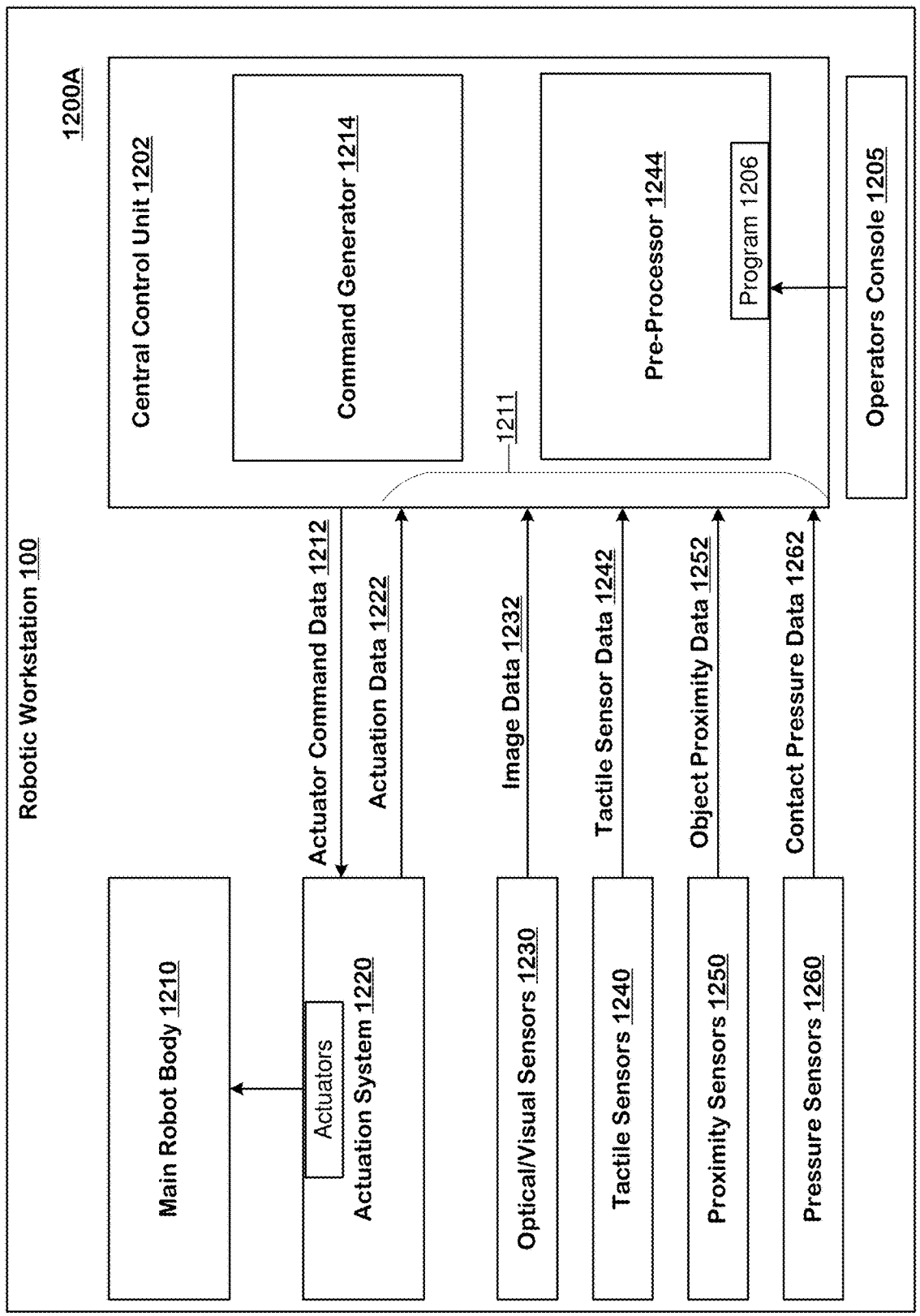
FIGS. 12A and 12B show implementations of an electronics architecture used by the robotic workstation in which a controller processes input data comprising at least actuation data from actuators of an actuation system, image data from visual sensors in the robot workstation, and tactile data from tactile sensors in the robotic workstation and generates actuator command data.
Figure 12B:
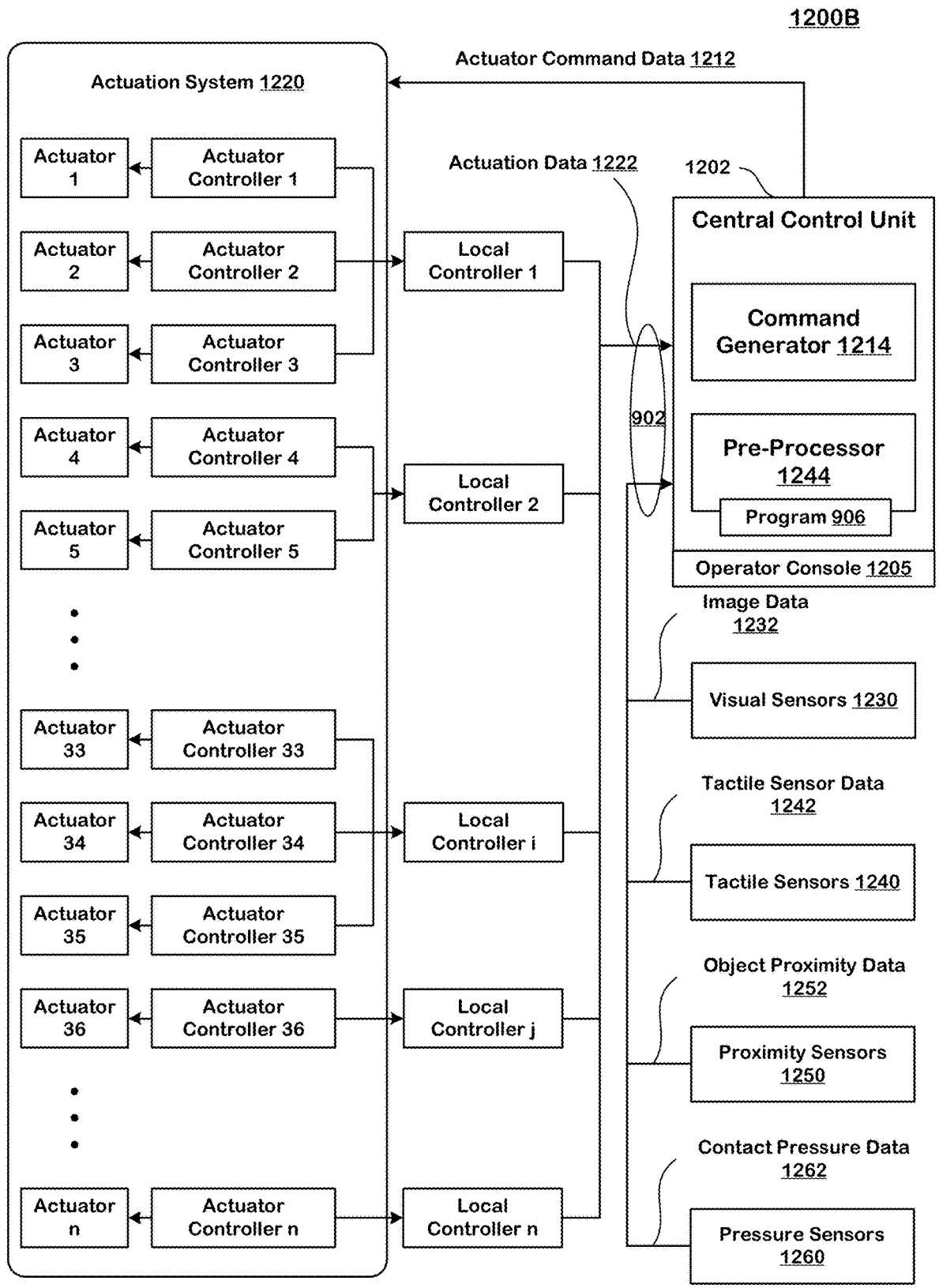

FIGS. 12A and 12B show implementations of an electronics architecture used by the robotic workstation in which a controller processes input data comprising at least actuation data from actuators of an actuation system, image data from an imaging system (i.e., visual sensors) in the robot workstation, and tactile data from tactile sensors in the robotic workstation and generates actuator command data.

FIG. 12A is a simple functional block diagram of the robotic workstation 100. In FIG. 12A, the electronics architecture 1200A comprises the central control unit 1202 that controls the actuators (e.g., that control manipulators, such as the robotic manipulator 102) including sources of motive force and, therefore the linkages, joints, and gripper/end effector, etc. of the robotic workstation 100, using the command generator 1214 and/or the pre-processor 1244.

The robotic workstation 100 includes main robot body 1210, including the kinematic chain, and the actuation system 1220. The robotic workstation 100 includes a central control unit 1202 (i.e., controller) that in this example comprises the command generator 1214 and the pre-processor 1244. The controller 1202 is in communication with the plurality of actuators and the sensors and operates the components on the kinematic chain. The controller 1202 includes a feedback loop receiving feedback data derived from or including the actuator data and sensor data as feedback input, trained to generate actuator command data 1212 to cause the robotic workstation 100 to execute a task to manipulate the object responsive to the feedback data, under direct operator control and/or by programmed logic. Implementation specifics vary considerably, however in one example a Controllogix™ PLC is used to implement the central control unit 1202. Training may be implemented using programming by an operator at operator's console 1205. In other embodiments, machine learning algorithms and techniques are used to generate, or augment existing, commands to the robotic workstation 100.

The actuation system 1220 can include sources of motive force, e.g., electric motors, hydraulic cylinders, pneumatic cylinders and the like, coupling actuators, e.g., linkages, springs, levers, and so forth, and sensors affixed to one or the other, e.g., encoders, position sensors, combinations thereof or the like. The actuation system 1220 provides actuation data 1222 to the central control unit 1202, and receives actuator command data 1212, including actuator commands, from the central control unit 1202. Also, the robotic workstation 100 includes, as described above, optical/visual sensors 1230 (also referred to herein as the imaging system) generating image data 1232 and range data, tactile sensors 1240 in this example generating tactile sensor data 1242, proximity sensors 1250 in this example generating object proximity data 1252 relative to the end effectors, and pressure sensors 1260 in this example generating contact pressure data 1262. The actuation data 1222, the image data 1232, the tactile sensor data 1242, the object proximity data 1252, and the contact pressure data 1262 are provided to the central control unit 1202.

The command generator 1214 can plan motion of components of the robotic workstation 100, such as the robotic manipulator 102 and use this motion plan to generate a sequence of commands commanding the joints of the robotic workstation 100 for the purposes of advancing the robotic workstation 100 to a goal state provided by the pre-processor 1244 to the command generator 1214.

The pre-processor 1244 can process the actuation data 1222, the image data 1232, the tactile sensor data 1242, the object proximity data 1252, and the contact pressure data 1262 to produce a state vector for the robotic workstation 100. This state vector is produced in a time frame and manner as needed to control the state of the robotic workstation 100 and is accessible to task programming provided to the robotic workstation 100 via the operator's console 1205. The pre-processor 1244 can include one or more trained neural networks used for the purpose of deriving feedback data for input the neural network that generates the command data. Also, the command generator can include one or more trained neural networks. In some implementations, the command generator and the pre-processor comprise neural networks trained end-to-end using reinforcement learning. Other training procedures can be applied as well, including separate training of the neural networks in the controller.

Thus, the central control unit 1202 processes input data comprising at least the actuation data 1222 from the actuators of the actuation system 1220, the image data 1232 from the optical/visual sensors 1230 of the imaging system if present, and if present, other sensor data such as the tactile sensor data 1242 from the tactile sensors 1240 of the robotic workstation 100 and generates actuator command data 1212.

In some implementations, with reference to FIG. 12B, an electronics architecture 1200B further comprises distributed local controllers that are responsible for low-level motor control, including current, velocity, and position control, evaluation of the joint sensors, output control signals to the actuator power electronics, parameterization of the actuator controllers, e.g., for gain scheduling, and data acquisition from the force/torque sensors and inertial measure measurement system. Each local controller can handle a set of actuators (e.g., one, two, or three actuators). Cable harnesses connect the actuator sensors, actuators, drives to the local controllers. The central control unit 1202 and the local controllers can communicate by a high-speed communication interface such as CAN, FireWire, or SERCOS, supporting real-time control in which each new set of actuator commands is based on feedback data that indicates the effects of the immediately preceding command set on the pose of the robot and the object of the task.

Controller

The central control unit 1202 includes the command generator 1214 and the pre-processor 1244, in this example, implementing a control loop that includes processing the input data for an instant time interval, and generating the actuator command data 1212 for use in a next time interval.

The central control unit 1202 is also configured with a system file including a program file (e.g., program file 1206) that specifies the task(s) to be executed by the robotic workstation 100. The program file can identify the task in a sequence of sub-tasks, along with goal positions, goal angles, maximum and minimum values for sampling the goal positions and the goal angles, policy paths and trajectories, policy speedup coefficients, feedback actions and vacuum actions. Each "task" can be implemented to be triggered based upon a set of detected input conditions, duty cycle, operator command issued at the operators' console 1205 or otherwise. In one implementation, a set of weights generated by training a neural network system, including a trained neural network in a feedback loop receiving feedback data derived from or including the actuator data and the sensor data as feedback input, trained to generate actuator command data to cause the robot to execute the task to manipulate the object, or the robot in preparation for manipulation of an object, in response to the feedback data. The neural network system that can be trained using reinforcement learning algorithms and configured with a policy that implements the control feedback loop. The neural network system can use neural networks like a multi-layer perceptron (MLP), a feed-forward neural network (FFNN), a fully connected neural network (FCNN), a convolutional neural network (CNN), and a recurrent neural network (RNN). Examples of the reinforcement learning algorithms include deterministic policy gradient algorithms, and policy-gradient actor-critic algorithms like deep deterministic policy gradient (DDPG) with hindsight experience replay (HER) and distributed distributional deterministic policy gradient (D4PG).

The input data 1211 can includes the range image data 1232 from the visual sensors 1230 indicating the orientation and position of the timber and the robotic manipulator 102 in three dimensions and time, and the actuation data 1222 from the actuators of the actuation system 1220. The input data 1211 can further include the tactile sensor data 1242 from the tactile sensors 1240 in the robotic manipulator 102 or other components of the robotic workstation 100. The input data 1211 can further include the object proximity data 1252 from the proximity sensors 1250. The input data 1211 can further include the contact pressure data 1262 from the pressure sensors 1260. The input data 1211 can further include external motion tracking data from an external, stand-alone motion tracking system like OptiTrack™ type motion capture system that tracks motion of the robotic workstation 100 and the object in a three-dimensional space. The input data 1211 can be used as feedback data in the feedback loop, and can be used to derive feedback data, and both.

The actuator command data 1212 updates one or more of the actuator parameters of the actuators. Examples of the actuator command data 1212 include position updates, absolute positions, angle updates, absolute angles, torque updates, absolute torques, speed updates, absolute speeds, velocity updates, absolute velocities, acceleration updates, absolute accelerations, rotation updates, and absolute rotations. The actuator command data 1212 is used to update the respective states of the actuators in the next time interval, which in turn causes the tendons, the joints, the body parts, and other components of the robotic workstation 100 to transition to a different state (e.g., tension, position, orientation) in the next time interval.

The actuator command data 1212 can include commands for each of the actuators or only a subset of the actuators. Each command can include an actuator ID, and a numerical value or values used to drive the actuator to a next state.

In the implementation listed above, the actuator command data 1212 provided as output of the controller comprising a vector of drive changes for differential positioning, or a vector of position mode target positions, or a vector of force/torque values, and various combinations of differential mode commands, position mode command as suitable for the actuators under control.

The actuators execute the commands specified in the actuator command data 1212 and generate the actuation data 1222 for the next time interval, and cause generation of the image data 1232 by the visual sensors 1230 and the tactile sensor data 1242 by the tactile sensors 1240 for the next time interval. The process is iterated by the control loop implemented by the controller 1202.

In some implementations, the actuator command data 1212 generated by the controller 1202 is processed by a calibration module (not shown) that generates a calibrated version of the actuator command data 1212 which is specific to the configuration of the robotic workstation 100. The calibrated version of the actuator command data is used to update the respective states of the actuators.

Additional features included in various implementations of the robotic workstation 100 include the use of sensors such as (i) encoders for movement measurement of various components of the robotic workstation 100, (ii) current transducers allowing the system to automatically detect a stall or jamb condition of a robotic manipulator and signal for assistance; and (iii) area sensors for detection of entry into a danger zone.

Some Particular Implementations

We describe various implementations of a robotic workstation.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A system implementation of the technology disclosed includes a robotic workstation for unstacking and stacking a multi-layer stack of boards one layer at a time. The robotic workstation includes an end effector configured to pick up and release an entire layer of boards of the multi-layer stack of boards. The end effector includes a first support member and a second support member, the first support member and the second support member being substantially parallel with one another, a first cross member and a second cross member, each of the first and second cross members extending between and being connected to both the first and second support members, a first pick up and release member and a second pick up and release member, each of the first and second pick up and release members being (i) disposed below the first and second support members when the end effector is picking up, moving and releasing the entire layer of boards, (ii) transversely arranged with respect to the first and second support members and (iii) attached to both of the first and second support members, and an attachment plate. The robotic workstation can also include a robotic manipulator connected to the attachment plate of the end effector and capable of moving the end effector. The robotic manipulator is under programmed control of a programmable robot controller executing stored instructions. The stored instructions, when executed, perform operations including picking up the entire layer of boards with the first and second pick up and release members by orienting the end effector such that each board of the entire layer of boards is transversely oriented with respect to the first and second pick up and release members.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

In one implementation each layer of boards includes at least 5 boards.

In another implementation the end effector includes a third pick up and release member.

In a further implementation wherein the end effector can further comprise an automatic height adjustment system connecting each of the first and second pick up and release members to the first and second support members, and the height adjustment system adjusts the height of the first and second pick up and release members with respect to one another and with respect to the first and second support members to account for unevenness in any of the boards being picked up and moved by the end effector.

In one implementation, the automatic height adjustment system includes first and second height adjustment mechanisms connecting the first pick up and release member to the first and second support members, and third and fourth height adjustment mechanisms connecting the second pick up and release member to the first and second support members.

In a further implementation the first, second, third and fourth height adjustment mechanisms include springs for automatically adjusting the heights of the first and second pick up and release members as downward pressure is being applied to the end effector by the robotic manipulator and as upward pressure is being received by the first and second pick up and release members from the boards.

In another implementation the robotic workstation can include a vacuum system controlled by the programmable robot controller and providing vacuum air pressure to each of the first and second pick up and release members.

In a further implementation the vacuum system provides suction pressure when picking up and moving the boards and provides less or no air pressure or reverse air pressure when releasing the boards.

In one implementation the robotic workstation can further include pressure sensors configured to continuously monitor the pressure of the vacuum system and continuously adjust the air pressure according to the continuously monitored air pressure.

In another implementation the stored instructions, when executed, further perform operations including moving the picked-up layer of boards from a first location at which the boards were picked up to a second location and releasing the boards after they have been moved to the second location.

In another implementation the robotic workstation operates in a stacking mode in which the boards are (i) picked up from a non-stacking location at which the boards are not stacked, (ii) moved to another location and (iii) released onto the multi-layer stack of boards.

In a further implementation, the robotic workstation operates in an unstacking mode in which the boards are (i) picked up from a top layer of the multi-layer stack of boards, (ii) moved to another location and (iii) released onto a conveyor or roller-type transportation system for further processing.

In one implementation the robotic workstation can further include an imaging system that identifies at least one of (i) when the multi-layer stack of boards has been deposited for unstacking, (ii) a size and shape of the entire multi-layer stack of boards and the size and shape of at least one board of the boards, and (iii) when a last layer of boards of the multi-layer stack of boards has been picked up.

In another implementation, the robotic workstation can further include sensors configured to determine at least one of (i) whether or not any of the first and second pick up and release members is empty and (ii) head compression of the first and second pick up and release members with respect to the first and second support members to which they are attached (e.g., compression or location of the height adjustment mechanisms with respect to the support members and the pick up and release members).

A method implementation of the technology disclosed includes a method of unstacking or stacking a multi-layer stack of boards one layer at a time, using a robotic workstation. The robotic workstation can include an end effector configured to pick up, move and release an entire layer of boards of the multi-layer stack of boards, the end effector including: a first support member and a second support member, the first support member and the second support member being substantially parallel with one another; a first cross member and a second cross member, each of the first and second cross members extending between and being connected to both the first and second support members; a first pick up and release member and a second pick up and release member, each of the first and second pick up and release members being (i) disposed below the first and second support members when the end effector is picking up and releasing the entire layer of boards, (ii) transversely arranged with respect to the first and second support members and (iii) attached to both of the first and second support members; and an attachment plate. Additionally, the robotic workstation can include a robotic manipulator connected to the attachment plate of the end effector and capable of moving the end effector, the robotic manipulator being under programmed control of a programmable robot controller executing stored instructions. This method implementation includes executing the stored instructions to perform operations including picking up the entire layer of boards with the first and second pick up and release members by orienting the end effector such that each board of the entire layer of boards is transversely oriented with respect to the first and second pick up and release members.

Each of the features discussed in this particular implementation section for the first system implementation apply equally to this method implementation. As indicated above, all the system features are not repeated here and should be considered repeated by reference.

Other implementations may include a non-transitory computer readable storage medium storing instructions executable by a processor to perform a method as described above. Yet another implementation may include a system including memory and one or more processors operable to execute instructions, stored in the memory, to perform a method as described above.

In one implementation of the method, the operations further include controlling a vacuum system and providing vacuum air pressure to each of the first and second pick up and release members.

In another implementation of the method, the operations further include controlling the vacuum system to provide suction pressure when picking up and moving the boards and to provide no air pressure or positive air pressure when releasing the boards.

In a further implementation of the method, the operations further include continuously monitoring the pressure of the vacuum system using pressure sensors and continuously adjusting the air pressure according to the continuously monitored air pressure.

In one implementation of the method, the operations further include moving the picked up layer of boards from a first location at which the boards were picked up to a second location, and releasing the boards after they have been moved to the second location.

In a further implementation of the method, operations further include a stacking mode in which the boards are picked up from a non-stacking location at which the boards are not stacked, moved to another location and released onto the multi-layer stack of boards.

In another implementation of the method, the operations further include an unstacking mode in which the boards are picked up from a top layer of the multi-layer stack of boards, moved to another location and released onto a conveyor or roller-type transportation system for further processing.

In a further implementation, a robotic workstation for unstacking and stacking a multi-layer stack of items one layer at a time is provided. The robotic workstation can include an end effector configured to pick up, move and release an entire layer of boards of the multi-layer stack of boards. The end effector can include an attachment plate, and a first pick up and release member and a second pick up and release member, each of the first and second pick up and release members being (i) disposed below the attachment plate when the end effector is picking up and releasing the entire layer of items and (ii) attached directly or indirectly to the attachment plate. Further, the robotic workstation can include a robotic manipulator connected to the attachment plate of the end effector and capable of moving the end effector, the robotic manipulator being under programmed control of a programmable robot controller executing stored instructions, the stored instructions, when executed, performing operations including picking up the entire layer of items with the first and second pick up and release members by orienting the end effector such that each item of the entire layer of items is transversely oriented with respect to the first and second pick up and release members.

We claim:

1. A robotic workstation for unstacking and stacking a multi-layer stack of boards one layer at a time, the robotic workstation comprising:
    an end effector configured to pick up, move and release an entire layer of boards of the multi-layer stack of boards, the end effector comprising:
        a first support member and a second support member, the first support member and the second support member being substantially parallel with one another;
        a first cross member and a second cross member, each of the first and second cross members extending between and being connected to both the first and second support members;
        a first pick up and release member and a second pick up and release member, each of the first and second pick up and release members being (i) disposed below the first and second support members when the end effector is picking up and releasing the entire layer of boards, (ii) transversely arranged with respect to the first and second support members and (iii) attached to both of the first and second support members;
        a first spacer dispensing member and a second spacer dispensing member, each of the first spacer dispensing member and the second spacer dispensing member being (i) arranged between the first and second support members and (ii) in a substantially parallel orientation with respect to one another; and
        an attachment plate; and
    a robotic manipulator connected to the attachment plate of the end effector and capable of moving the end effector, the robotic manipulator being under programmed control of a programmable robot controller executing stored instructions, the stored instructions, when executed, performing operations including:
        picking up the entire layer of boards with the first and second pick up and release members by orienting the end effector such that each board of the entire layer of boards is transversely oriented with respect to the first and second pick up and release members.

2. The robotic workstation of claim 1, wherein each layer of boards includes at least 5 boards.

3. The robotic workstation of claim 1, wherein the end effector includes a third pick up and release member.

4. The robotic workstation of claim 1,
    wherein the end effector further comprises an automatic height adjustment system connecting each of the first and second pick up and release members to the first and second support members, and
    wherein the height adjustment system adjusts the height of the first and second pick up and release members with respect to one another and with respect to the first and second support members to account for unevenness in any of the boards being picked up and moved by the end effector.

5. The robotic workstation of claim 4, wherein the automatic height adjustment system comprises:
    first and second height adjustment mechanisms connecting the first pick up and release member to the first and second support members; and
    third and fourth height adjustment mechanisms connecting the second pick up and release member to the first and second support members.

6. The robotic workstation of claim 5, wherein the first, second, third and fourth height adjustment mechanisms automatically adjust the heights of the first and second pick up and release members as downward pressure is being applied to the end effector by the robotic manipulator and as upward pressure is being received by the first and second pick up and release members from the boards.

7. The robotic workstation of claim 1, further comprising a vacuum system controlled by the programmable robot controller and providing vacuum air pressure to each of the first and second pick up and release members.

8. The robotic workstation of claim 7, wherein the vacuum system provides suction pressure when picking up and moving the boards and provides no or less air pressure or reverse air pressure when releasing the boards.

9. The robotic workstation of claim 7, further comprising pressure sensors configured to continuously monitor the air pressure provided by the vacuum system and continuously adjust the provided air pressure according to the continuously monitored air pressure.

10. The robotic workstation of claim 1, wherein the stored instructions, when executed, further perform operations comprising:

moving the picked up layer of boards from a first location at which the boards were picked up to a second location; and releasing the boards after they have been moved to the second location.

11. The robotic workstation of claim 1, wherein the robotic workstation operates in a stacking mode in which the boards are (i) picked up from a non-stacking location at which the boards are not stacked, (ii) moved to another location and (iii) released onto the multi-layer stack of boards.

12. The robotic workstation of claim 1, wherein the robotic workstation operates in an unstacking mode in which the boards are (i) picked up from a top layer of the multi-layer stack of boards, (ii) moved to another location and (iii) released onto a conveyor or roller-type transportation system for further processing.

13. The robotic workstation of claim 1, further comprising an imaging system that identifies at least one of (i) when the multi-layer stack of boards has been deposited for unstacking, (ii) a size and shape of the entire multi-layer stack of boards and the size and shape of at least one board of the boards, and (iii) when a last layer of boards of the multi-layer stack of boards has been picked up.

14. The robotic workstation of claim 1, wherein the robotic workstation is configured to determine at least one of (i) whether or not any of the first and second pick up and release members is empty and (ii) head compression of the first and second pick up and release members with respect to the first and second support members to which they are attached.

15. The robotic workstation of claim 1, wherein each of the first and second spacer dispensing members is configured to ahold a stack of spacers and (ii) independently dispense one spacer onto at least a portion of the entire layer of boards, such that the dispensed spacers are substantially transversely arranged with respect to the orientation of the entire layer of boards.

16. A method unstacking or stacking a multi-layer stack of boards one layer at a time, using a robotic workstation including:
an end effector configured to pick up, move and release an entire layer of boards of the multi-layer stack of boards, the end effector comprising:
a first support member and a second support member, the first support member and the second support member being substantially parallel with one another;
a first cross member and a second cross member, each of the first and second cross members extending between and being connected to both the first and second support members;
a first pick up and release member and a second pick up and release member, each of the first and second pick up and release members being (i) disposed below the first and second support members when the end effector is picking up and releasing the entire layer of boards, (ii) transversely arranged with respect to the first and second support members and (iii) attached to both of the first and second support members;
a first spacer dispensing member and a second spacer dispensing member, each of the first spacer dispensing member and the second spacer dispensing member being (i) arranged between the first and second support members and (ii) in a substantially parallel orientation with respect to one another; and
an attachment plate; and a robotic manipulator connected to the attachment plate of the end effector and capable of moving the end effector, the robotic manipulator being under programmed control of a programmable robot controller executing stored instructions,
wherein the method includes executing the stored instructions to perform operations including:
picking up the entire layer of boards with the first and second pick up and release members by orienting the end effector such that each board of the entire layer of boards is transversely oriented with respect to the first and second pick up and release members, and
dispensing at least one spacer, from each of the first and second spacer dispensing members respectively, onto at least a portion of the entire layer of boards, such that dispensed spacers are substantially transversely arranged with respect to the orientation of the entire layer of boards.

17. The method of claim 16, wherein the operations further include controlling a vacuum system and providing vacuum air pressure to each of the first and second pick up and release members.

18. The method of claim 17, wherein the operations further include controlling the vacuum system to provide suction pressure when picking up and moving the boards and to provide no or less air pressure or reverse air pressure when releasing the boards.

19. The method of claim 17, wherein the operations further include continuously monitoring the air pressure provided by the vacuum system using pressure sensors and continuously adjusting the provided air pressure according to the continuously monitored air pressure.

20. The method of claim 16, wherein the operations further include:
moving the picked up layer of boards from a first location at which the boards were picked up to a second location; and
releasing the boards after they have been moved to the second location.

21. The method of claim 16, where the operations further include a stacking mode in which the boards are (i) picked up from a non-stacking location at which the boards are not stacked, (ii) moved to another location and (iii) released onto the multi-layer stack of boards.

22. The method of claim 16, wherein the operations further include an unstacking mode in which the boards are (i) picked up from a top layer of the multi-layer stack of boards, (ii) moved to another location and (iii) released onto a conveyor or roller-type transportation system for further processing.

23. A robotic workstation for unstacking and stacking a multi-layer stack of items one layer at a time, the robotic workstation comprising:
an end effector configured to pick up, move and release an entire layer of boards of the multi-layer stack of boards, the end effector comprising:
an attachment plate; and
a first pick up and release member and a second pick up and release member, each of the first and second pick up and release members being (i) disposed below the attachment plate when the end effector is picking up and releasing the entire layer of items and (ii) attached directly or indirectly to the attachment plate;
a first spacer dispensing member and a second spacer dispensing member, each of the first spacer dispensing member and the second spacer dispensing member being (i) arranged between a first support member and a second support member and (ii) in a substantially parallel orientation with respect to one another; and a robotic manipulator connected to the attachment plate of the end effector and capable of moving the end effector, the robotic manipulator being under programmed control of a programmable robot controller executing stored instructions, the stored instructions, when executed, performing operations including:

picking up the entire layer of items with the first and second pick up and release members by orienting the end effector such that each item of the entire layer of items is transversely oriented with respect to the first and second pick up and release members.

* * * * *

UNITED STATES PATENT AND TRADEMARK OFFICE
CERTIFICATE OF CORRECTION

PATENT NO. : 11,840,410 B2
APPLICATION NO. : 17/540221
DATED : December 12, 2023
INVENTOR(S) : Marc Brinkmeyer It is certified that error appears in the above-identified patent and that said Letters Patent is hereby corrected as shown below:

In the Claims

In Claim 15, Column 19, Line 34, replace "ahold" with "(i) hold"

Signed and Sealed this
Twenty-sixth Day of March, 2024

*Katherine Kelly Vidal*

Katherine Kelly Vidal
*Director of the United States Patent and Trademark Office*